United States Patent [19]

Moreland

[11] Patent Number: 5,369,779
[45] Date of Patent: Nov. 29, 1994

[54] TWO-WAY MMDS COMMUNICATIONS SYSTEM

[75] Inventor: Larry K. Moreland, McHenry, Ill.

[73] Assignee: Zenith Electronics Corp., Glenview, Ill.

[21] Appl. No.: 84,655

[22] Filed: Jun. 28, 1993

[51] Int. Cl.⁵ .................. H04H 1/00; H04B 1/40; H04N 7/14
[52] U.S. Cl. .................. 455/5.1; 455/6.2; 455/86; 348/10; 348/12
[58] Field of Search .................. 348/10, 12, 13, 470; 455/3.2, 4.2, 5.1, 6.1, 6.2, 6.3, 76, 78, 82, 84, 86, 88, 131, 218, 212; 343/840; 380/7, 10; H04N 7/20, 7/14

[56] References Cited

U.S. PATENT DOCUMENTS

| | | | |
|---|---|---|---|
| 3,886,302 | 5/1975 | Kosco | 455/5.1 |
| 4,907,291 | 3/1990 | Yamamoto | 455/86 |
| 5,001,554 | 3/1991 | Johnson et al. | 455/3.2 |
| 5,101,267 | 3/1992 | Morales-Garza | 348/13 |
| 5,170,490 | 12/1992 | Cannon et al. | 455/84 |
| 5,300,941 | 4/1994 | Hemmie et al. | 343/840 |

OTHER PUBLICATIONS

Consumer IC Handbook, GEC Plessey, Sep., 1991, pp. 8–4 through 8–9.

*Primary Examiner*—Curtis Kuntz
*Assistant Examiner*—Lisa Charouel

[57] ABSTRACT

A first mixer block converts received MMDS channel frequencies to MMDS frequencies capable of being processed by an MMDS decoder. The MMDS decoder, which includes a crystal controlled reference generator, is located in a benign environment. The reference is supplied to a phase locked loop for controlling a fixed frequency local oscillator that supplies the first mixer. The local oscillator output is also supplied to a second mixer that produces a response signal, of a different frequency, by biphase shift key modulation of said reference that is transmitted back to the transmitting site via the antenna. A squelch circuit precludes transmission of the unmodulated reference.

11 Claims, 1 Drawing Sheet

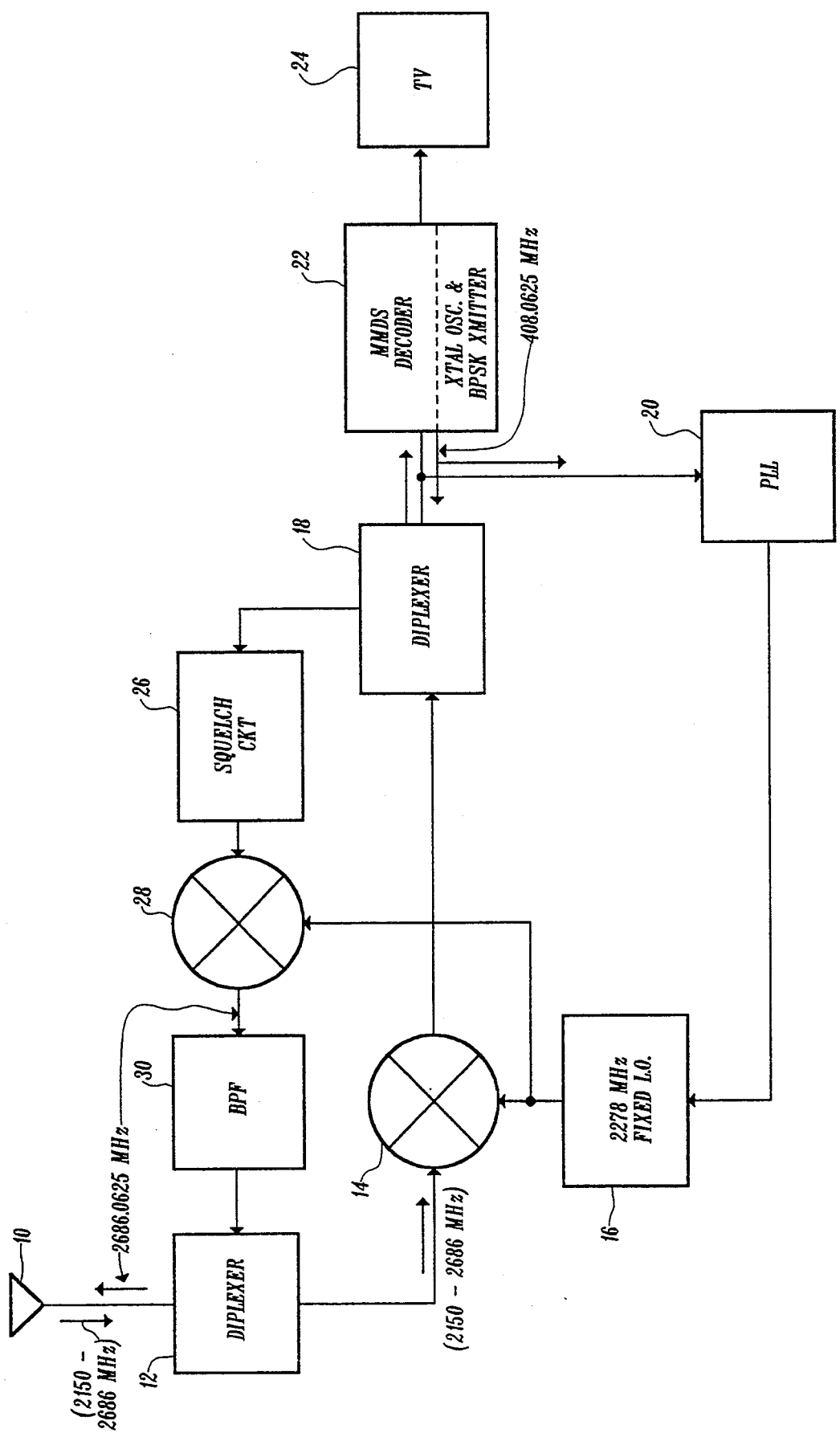

TWO-WAY MMDS COMMUNICATIONS SYSTEM

BACKGROUND OF THE INVENTION AND PRIOR ART

This invention relates generally to television signal transmission systems and specifically to so-called MMDS (microwave multipoint distribution systems).

MMDS distribution systems carry over-the-air television type signals in a restricted frequency range. The frequency range of the 6 MHz MMDS channels is 2150 MHz to 2686 MHz. A response signal arrangement is provided for in the channel frequency allocations whereby the MMDS receiving site may communicate back to the transmitting site. These systems are well known in the art and generally embody a pole-mounted block converter for downconverting the received analog MMDS channels to corresponding signal frequencies that the MMDS decoder is capable of processing. The downconverter includes a fixed frequency local oscillator operating at 2278 MHz that is generally in a crystal controlled phase locked loop (PLL) circuit arrangement for supplying a local oscillator output signal to a mixer that receives the input MMDS channels. The response signal is generated by a separate FM transmitter or may be carried over a separate telephone line. Ideally, the MMDS block converter oscillator is immune to environmental conditions to enable a highly stable 2278 MHz local oscillator output. In practice, the local oscillator output cannot be stabilized under the adverse environmental conditions in which it must operate. Even with a crystal controlled phase locked loop, and with the relatively reduced stability requirements of an analog signal system, difficulty is experienced with stability. Under these conditions, the oscillator is not sufficiently stable to permit generation of the response frequency, which is different from the MMDS signal frequency and must be precisely controlled. In the present analog signal environment, the art has failed to produce a simple, stable, low cost, two-way MMDS system that would permit the response signal to be radiated back to the transmission site via the receiver antenna. Further, in the rapidly forthcoming digital signal transmission systems with their much more stringent stability requirements, a need exists for a cost effective two-way MMDS communications system.

OBJECTS OF THE INVENTION

A principal object of the invention is to provide a novel two-way MMDS transmission system.

Another object of the invention is to provide a two-way MMDS system that is capable of operating with digital signals.

A further object of the invention is to provide a simple, low cost, stable two-way MMDS digital transmission system.

BRIEF DESCRIPTION OF THE DRAWINGS

These and other objects and advantages of the invention will be apparent upon reading the following description in conjunction with the drawing, the single figure of which is a simplified block diagram of a two-way MMDS system constructed in accordance with the invention.

DESCRIPTION OF THE PREFERRED EMBODIMENT

Referring to the drawing, an antenna 10 is coupled to a diplexer 12 which supplies a mixer 14 that also receives the output of a fixed frequency output local oscillator 16. The output of mixer 14 consists of a downconverted group of MMDS channel frequencies and is supplied to another diplexer 18, the output of which feeds a block 22 that includes an MMDS decoder and a data transmitter. The MMDS decoder in block 22 supplies a conventional television receiver 24 with the decoded MMDS channels. The transmitter in block 22 develops a reference that is BPSK (biphase shift key) modulated to form a data signal for transmission back to the transmitting site (not illustrated) in the form of a response signal of precise frequency. The data signal is coupled through diplexer 18 to a squelch circuit 26, the output of which is coupled to another mixer 28 which is also supplied with the output of fixed local oscillator 16 for converting the data signal to the frequency of the response signal. The response signal is supplied by the mixer 28, via a bandpass filter 30 and diplexer 12, to antenna 10 for radiation back to the transmitting site. The transmitter in block 22 generally includes a crystal oscillator to develop the stable reference which is coupled to a phase locked loop 20 to produce the actual control signal for fixed local oscillator 16.

As indicated on the drawing, the 6 MHz MMDS channel signals are in the frequency range of 2150 to 2686 MHz. The response frequency is indicated as 2686.0625 MHz, but as those skilled in the art will readily perceive, will differ depending upon the MMDS particular response frequency assigned to the decoder. The diplexer 12 is capable of passing the received MMDS channels to mixer 14 from antenna 10 and the converted data signal (response signal) from mixer 28 back to antenna 10. The circuits for performing these functions are well known in the art and require no further description here. Similarly, the structures of diplexer 18 and squelch circuit 26 are well known in the art as are PLL 20 and mixer 28.

The MMDS decoder in block 22 is also well known in the art. The crystal oscillator and BPSK transmitter of block 22 may conveniently consist of the oscillator and transmission module of a Z-view transmitter available from Zenith Electronics Corporation and fully described in U.S. Pat. Nos. 4,528,663; 4,553,161; 4,554,579 and 4,586,078. As indicated, the crystal oscillator produces a stable reference (carrier) of 408.625 MHz which is applied to PLL 20, and through diplexer 18, to squelch circuit 26. The data, in the form of biphase shift key modulation of the carrier, occurs for only a very short interval and consequently the phase modulation created does not result in "unlocking" of phase locked loop 20. At all times, except during modulation for the data signal, the level of the reference that is supplied to the phase locked loop 20 and to squelch circuit 26 is very low. While the level is high enough to control the PLL, it is too low to activate squelch circuit 26. Consequently, except during actual transmission of data, the squelch circuit 26 precludes the reference from being radiated from antenna 10. Yet, the reference signal is continuously available to stabilize phase locked loop 20 (and thereby control the fixed local oscillator 16).

In accordance with the invention, the MMDS decoder and the reference generator of block 22 are in a benign environment, i.e. located within a home or other dwelling where the temperature is controlled within fairly narrow limits and where the sensitive circuitry is shielded from the adverse effects of an outdoor environment. The remainder of the circuitry in the figure is mounted externally, generally as a part of the antenna structure, and is subject to environmental conditions that would seriously impair the stability of the local oscillator in prior art systems. The provision of the very stable reference within the benign MMDS decoder environment, overcomes the major stability problem associated with the prior art systems and also permits systems using the invention to operate with digital signals which, as is well known in the art, require very precise control of conversion frequencies.

While a specific frequency for the crystal oscillator is identified, there are systems in which a different frequency may be more convenient. For example, an 11 MHz oscillator is a viable alternative. In that event, those skilled in the art will readily perceive that the 11 MHz reference supplied from block 22 to PLL 20 would need to be multiplied to develop the 408.0625 MHz signal (or other signal dependent upon the particular response frequency desired) for mixing with the output of fixed local oscillator 16 in mixer 28. It will also be appreciated that power for the mixers and other MMDS components may be supplied by the decoder 22 along the cable via diplexer 18 as needed.

The result of the invention is a very compact environmentally stable two-way MMDS transmission system that is suitable for use with digital signals. It is recognized that numerous changes in the described embodiment of the invention will be apparent to those skilled in the art without departing from its true spirit. The invention is to be limited only as defined in the claims.

What is claimed is:

1. A two-way microwave multipoint distribution system MMDS comprising:
   an antenna for receiving a plurality of MMDS channels in the MMDS frequency band from a transmitting site;
   an MMDS decoder;
   a local oscillator for generating a local oscillation signal;
   means responsive to said local oscillator signal for block converting said plurality of MMDS channels to a corresponding plurality of channels comprising corresponding frequencies receivable by said MMDS decoder;
   means for generating a data signal as modulation of carrier;
   means responsive to said local oscillator signal for converting said data signal to a frequency in close proximity to said MMDS frequency band; and
   means for coupling the block converted channels to an input of said MMDS decoder and for coupling the converted data signal to said antenna for radiation back to said transmitting site.

2. The system of claim 1 wherein said MMDS frequency band is 2150 MHz to 2686 MHz and said local oscillator has a frequency output of 2278 MHz.

3. The system of claim 1 wherein said MMDS decoder is located in a benign environment and further including a crystal controlled oscillator in said benign environment for supplying a reference for controlling said local oscillator and for serving as said carrier.

4. The system of claim 3 wherein said data signal comprises biphase shift key modulation of said carrier.

5. The system of claim 4 further including a squelch circuit coupling said data signal to said antenna, said carrier, when unmodulated, being insufficient in amplitude to activate said squelch circuit.

6. A two-way microwave multipoint distribution system MMDS comprising:
   an antenna for receiving MMDS channels in a MMDS frequency band from a transmitting site and for supplying a response signal of a different frequency from said antenna to said transmitting site;
   first mixer means coupled to said antenna for block converting said received MMDS channels to a corresponding plurality of MMDS signal frequencies;
   an MMDS decoder means for receiving said MMDS signal frequencies and further including a crystal controlled oscillator and data transmitter for generating a reference signal;
   a local oscillator for controlling said first mixer means, said local oscillator being controlled by said reference signal;
   said data transmitter generating a data signal by modulating said reference signal; and
   second mixer means controlled by said local oscillator for converting said data signal to said response signal and for coupling said response signal to said antenna for radiation to said transmitting site.

7. The system of claim 6 further including a phase locked loop supplied with said reference signal and controlling said local oscillator; and
   a squelch circuit coupling said reference signal to said second mixer means.

8. The system of claim 7 wherein said data signal comprises biphase shift key modulation of said reference signal said squelch circuit being enabled only when said data signal is generated.

9. The system of claim 6 wherein said reference signal is produced in a benign environment.

10. A two-way microwave multipoint distribution system MMDS comprising:
    an antenna for receiving a plurality of MMDS channels from a transmitting site in a MMDS frequency band of 2150–2686 MHz;
    a local oscillator for generating a local oscillation signal;
    an MMDS decoder located in a benign environment;
    first mixer means responsive to said local oscillator signal having a predetermined frequency for block converting said plurality of MMDS channels to a corresponding plurality of channels comprising a band of frequencies receivable by said MMDS decoder;
    a crystal controlled reference signal generator in said MMDS decoder for supplying a reference for controlling said local oscillator and for serving as a carrier;
    means for generating a data signal as biphase shift key modulation of said carrier;
    second mixer means responsive to said local oscillator signal for converting said data signal to a response frequency in close proximity to said MMDS frequency band and for coupling the converted data signal to said antenna for radiation back to said transmitting site;
    diplexer means for coupling the block converted channels to an input of said MMDS decoder and for receiving said data signal; and
    a squelch circuit for coupling said data signal from said diplexer means to said second mixer means, said carrier, when unmodulated, having insufficient amplitude to activate said squelch circuit.

11. The system of claim 10 wherein said predetermined frequency comprises 2278 MHz.

* * * * *